United States Patent
Sugiyama et al.

(10) Patent No.: US 7,482,401 B2
(45) Date of Patent: Jan. 27, 2009

(54) CARBON BLACK AND RUBBER COMPOSITION CONTAINING SAME

(75) Inventors: Tomoaki Sugiyama, Hiratsuka (JP); Hiroshi Wakamatsu, Onomichi (JP); Sadayuki Fujita, Kakogawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 79 days.

(21) Appl. No.: 11/248,234

(22) Filed: Oct. 13, 2005

(65) Prior Publication Data

US 2006/0079625 A1 Apr. 13, 2006

(30) Foreign Application Priority Data

Oct. 13, 2004 (JP) .............................. 2004-298650

(51) Int. Cl.
*B60C 1/00* (2006.01)

(52) U.S. Cl. ....................................... 524/495; 524/496

(58) Field of Classification Search .................. 524/274, 524/495, 496

See application file for complete search history.

(56) References Cited

U.S. PATENT DOCUMENTS

2003/0078327 A1 * 4/2003 Morriston .................... 524/270

FOREIGN PATENT DOCUMENTS

JP 2003-063206 A 3/2003

* cited by examiner

*Primary Examiner*—Peter D Mulcahy
(74) *Attorney, Agent, or Firm*—Connolly Bove Lodge & Hutz LLP

(57) ABSTRACT

A carbon black friendly to the global environment and a rubber composition containing the same, that is, a carbon black obtained from, as a starting material, a tall oil having an alkali metal ion concentration of 1000 ppm or less and a rosin content of 5 to 90% by weight and a rubber composition containing the same.

2 Claims, No Drawings

CARBON BLACK AND RUBBER COMPOSITION CONTAINING SAME

BACKGROUND OF THE INVENTION

1. Field of the Invention

The present invention relates to a carbon black capable of compounding into a rubber composition and also relates to a rubber composition containing the same, more particularly relates to a carbon black friendly to the global environment and a rubber composition containing the same.

2. Description of the Related Art

In the past, in rubber compositions for tire and other general rubber use, many types of starting materials obtained from oil resources, etc. are used. This has been considered a problem, in some cases, in terms of protection of the global environment. From this viewpoint, for example, Japanese Patent Publication No. 2003-63206A proposes an eco-tire using non-oil resources as starting materials.

The carbon black conventionary used for reinforcing rubber is generally produced from oil, coal, or other fossil-fuel-derived starting material oils. However, it is desirable to decrease the amount of the carbon black to be used from the viewpoint of alleviating global warming and otherwise lightening the environmental load.

SUMMARY OF THE INVENTION

Accordingly, the object of the present invention is to provide a carbon black capable of being used, as a filler generally compounded into a rubber composition for tires etc., without using the conventional fossil-fuel-derived starting materials, to provide a rubber composition suitable for producing pneumatic tires, comparable to conventional rubber compositions by compounding the carbon black.

In accordance with the first aspect of the present invention, there is provided a carbon black obtained from as a starting material, a tall oil having an alkali metal ion concentration of 1000 ppm or less and a rosin content of 5 to 90% by weight.

In accordance with the second aspect of the present invention, there is provided a rubber composition containing 100 parts by weight of a diene-based rubber and 1 to 150 parts by weight of the above-mentioned carbon black.

According to the present invention, by compounding, to a diene-based rubber, a carbon black produced from, as a starting material, a tall oil having a concentration of an alkali metal ion such as sodium ion, potassium ion, of 1000 ppm or less, preferably 0.001 ppm to 900 ppm, and a rosin content of 5 to 90% by weight, preferably 10 to 85% by weight, it is possible to obtain a rubber composition having the properties comparable with rubber compositions containing carbon black produced by the conventional methods.

DESCRIPTION OF THE PREFERRED EMBODIMENTS

In this specification and in the claims which follow, the singular forms "a", "an" and "the" include plural referents unless the context clearly dictates otherwise.

The carbon black according to the present invention, as explained above, is produced using a tall oil, as a starting material, in particular a tall oil having an alkali metal ion concentration of 1000 ppm or less, preferably 0.001 ppm to 900 ppm, and a rosin content of 5 to 90% by weight, preferably 10 to 85% by weight.

If the alkali metal ion concentration of the tall oil is too high, the colloidal properties cannot be controlled and a carbon black having the desired colloidal properties for tire applications cannot be obtained. If the rosin content is too low, the yield of the carbon black becomes impractically low, while if conversely too high, the carbon black will solidify at room temperature and the handling thereof will become impractical.

The tall oil usable for the production of the carbon black according to the present invention may be a generally commercially available tall oil, but the above-mentioned alkali metal ion concentration and rosin content must be satisfied. To obtain such a tall oil, for example, it is possible to wash a crude tall oil or to distill it. The crude tall oil is recovered, as a byproduct, when producing pulp and is a plant-derived sustainable resource. This crude tall oil may be distilled to obtain tall oil fatty acid, tall oil rosin, distilled tall oil, tall oil head, and tall oil pitch as fractions. These tall oil products obtained by such treatment may be used alone or mixed in any ratio as the starting material of the production of carbon black. The method for producing a carbon black from the tall oil according to the present invention is not particularly limited. Methods using conventional fossil-fuel oils may be adopted.

As the diene-based rubber component usable in the rubber composition according to the present invention, any diene-based rubber capable of using tire or other general rubber use, for example, various types of natural rubber (NR), various types of polyisoprene rubbers (IR), various types of styrene-butadiene copolymer rubbers (SBR), various types of polybutadiene rubbers (BR), various types of acrylonitrile-butadiene copolymer rubbers (NBR), ethylene-propylene-diene copolymer rubber (EPDM), epoxylated natural rubber (ENR), etc. may be mentioned. These may be used alone or in any combination thereof.

The rubber composition according to the present invention may contain, in addition to the above essential components, other carbon black (but, in relatively small amounts), silica, or other fillers, vulcanization or cross-linking agents, vulcanization or cross-linking accelerators, various types of oils, antioxidants, plasticizers, and other various additives generally used for tire and other general rubber applications. The additives may be mixed by general methods to obtain compositions for vulcanization or cross-linking. The amounts of these additives may be in the general amounts used insofar as the object of the present invention is not adversely affected.

EXAMPLES

Examples will now be used to explain the present invention further, but the scope of the present invention is by no means limited to the Examples.

Production of Carbon Black CB-1 to CB-4

Carbon black CB-1 and CB-2 (i.e., Examples) and CB-3 and CB-4 (i.e., Comparative Examples) were produced using, as a starting material, tall oils having the alkali metal ion concentrations (ppm) and rosin contents (% by weight) shown in Table I, as follows.

That is, a special reactor oven lined with brick capable of withstanding high temperatures of as much as about 2000° C. was charged with a fuel and air, which were then completely burned to form a high temperature atmosphere of 1400° C. or more, then the starting oil was continuously sprayed into the atmosphere in a liquid state to be pyrolytically decomposed.

Water was sprayed into the high temperature gas containing the carbon black produced at the rear of the reactor oven to stop the reaction, then a bag filter was used to separate the carbon black and exhaust gas. The separated carbon black was increased in bulk density in a stirring tank, then granulated. The carbon black (CB) thus obtained was measured for iodine adsorption (mg/g) (measured according to JIS K6217) and DBP absorption (ml/100 g) (measured according to JIS K6217). The results are shown in Table I. Note that Table I also shows the values of commercially available carbon black N234 and N339 (see notes to Table II), as reference.

TABLE I

|  | Type of carbon black | | | | | |
| --- | --- | --- | --- | --- | --- | --- |
|  | CB-1 | CB-2 | N234 | N339 | CB-3 | CB-4 |
| Concentration of alkali metal ions (ppm) | 550 | 600 | 250 | 250 | 1500 | 400 |
| Rosin content (wt %) | 25 | 38 | — | — | 30 | 4 |
| CB yield (%) | 30 | 50 | 60 | 60 | 40 | 8 |
| Iodine adsorption (mg/g) | 119 | 142 | 120 | 90 | 19 | 104 |
| DBP absorption (ml/100 g) | 123 | 136 | 125 | 119 | 117 | 129 |

Examples 1 to 2 and Comparative Examples 1 to 3

Preparation of Samples

In each formulation, the ingredients other than the vulcanization accelerator and the sulfur were mixed in a 1.8 liter internal mixer for 4 to 5 minutes. When reaching 150±5° C., the resultant mixture was discharged to obtain a master batch. The vulcanization accelerator and sulfur were mixed to the master batch by an open roll to obtain a rubber composition. Note that the carbon black obtained using, as a starting material, a tall oil having a rosin content of a small 4% by weight (CB-4) was low in yield and not practical, and therefore the subsequent evaluation was not carried out.

Next, each rubber composition obtained was vulcanized in a 15×15×0.2 cm mold at 150° C. for 30 minutes to prepare a vulcanized rubber sheet. The evaluation and test methods shown below were then used to measure the physical properties of the vulcanized rubber. The results are shown in Table II.

Evaluation and Test Methods of Rubber Physical Properties

Hardness: Measured according to JIS K-6253 using Type A Durometer

300% modulus (M300): Measured according to JIS K-6251 using JIS No. 3 Dumbbell

Tensile strength (MPa): Measured according to JIS K-6251 using JIS No. 3 Dumbbell Elongation (%): Measured according to JIS K-6251 using JIS No. 3 Dumbbell Abrasion resistance: Measured using a Lambourn abrasion test under standard conditions described in JIS K-6264.7. The results of the measurement were indicated indexed to the value of Comparative Example 2 containing the carbon black N-339 as 100. The larger the value, the better the abrasion resistance exhibited.

Resilience: Measured by Lupke resilience test described in JIS K-6255

TABLE II

|  | Ex. | | Comp. Ex. | | |
| --- | --- | --- | --- | --- | --- |
|  | 1 | 2 | 1 | 2 | 3 |
| Formulation (parts by weight) | | | | | |
| NR*[1] | 100 | 100 | 100 | 100 | 100 |
| Carbon black N234*[2] | — | — | 45 | — | — |
| Carbon black N339*[3] | — | — | — | 45 | — |
| Carbon black CB-1*[4] | 45 | — | — | — | — |
| Carbon black CB-2*[4] | — | 45 | — | — | — |
| Carbon black CB-3*[4] | — | — | — | — | 45 |
| Zinc oxide*[5] | 5 | 5 | 5 | 5 | 5 |
| Stearic acid*[6] | 3 | 3 | 3 | 3 | 3 |
| Antioxidant*[7] | 1.5 | 1.5 | 1.5 | 1.5 | 1.5 |
| Sulfur*[8] | 2.0 | 2.0 | 2.0 | 2.0 | 2.0 |
| Vulcanization accelerator*[9] | 0.8 | 0.8 | 0.8 | 0.8 | 0.8 |
| Evaluated physical properties | | | | | |
| Hardness | 61 | 63 | 63 | 63 | 51 |
| 300% modulus (%) | 11.7 | 13.0 | 13.0 | 15.0 | 12.3 |
| Tensile strength (MPa) | 24.6 | 25.5 | 26.3 | 24.6 | 20.0 |
| Elongation (%) | 500 | 491 | 487 | 443 | 576 |
| Abrasion resistance (index) | 88 | 98 | 118 | 100 | 65 |
| Resilience | 56 | 54 | 52 | 58 | 62 |

Notes
*[1]RSS #1
*[2]Seast N made by Tokai Carbon
*[3]Seast KH made by Tokai Carbon
*[4]See above production of carbon black
*[5]Zinc Oxide #3 made by Seido Chemical Industry
*[6]Beads stearic acid "Kiri" made by NOF Corporation
*[7]Antigen 6C made by Sumitomo Chemical Industry
*[8]"Gold Flower" oil-treated sulfur powder made by Tsurumi Chemical
*[9]Vulkacit NZ/EGC made by Bayer The rubber compositions containing the carbon black CB-1 and CB-2 produced from the tall oil having the above properties, that is, the rubber compositions of Example 1 and Example 2, provided rubber physical properties substantially the same as those of conventional products, that is, the rubber compositions of Comparative Example 1 (containing N234) and Comparative Example 2 (containing N339). However, in Comparative Example 3 using the carbon black CB-3 produced from the tall oil having too high an alkali metal ion concentration, the colloidal properties cannot be controlled, and therefore, carbon black of the desired properties cannot be obtained. Further, if the rosin content is too small, the yield at the time of production of the carbon black impractically deteriorates not (CB-4).

As explained above, by using the tall oil having an alkali metal ion concentration of not more than a specific value and a rosin content within a specific range, it is possible to produce a carbon black having colloidal properties suitable as carbon black for tires. Further, by compounding the carbon black produced using this tall oil as a starting material oil, it is possible to obtain a composition having little environmental load and possible to use it as a rubber composition for pneumatic tires satisfying the needs of the times and other applications.

While the invention has been described with reference to specific embodiments chosen for purpose of illustration, it should be apparent that numerous modifications could be made thereto by those skilled in the art without departing from the basic concept and scope of the invention.

The invention claimed is:

1. A rubber composition comprising 100 parts by weight of a diene-based rubber and 1 to 150 parts by weight of a non-modified carbon black produced from, as a starting material, a tall oil having an alkali metal ion concentration of 1000 ppm or less and a rosin content of 5 to 90% by weight.

2. A rubber composition as claimed in claim 1, for a pneumatic tire.

* * * * *